United States Patent [19]

Tanguay

[11] 4,304,060
[45] Dec. 8, 1981

[54] PHONOGRAPH ACTUATED ELEMENTS

[76] Inventor: Henri Tanguay, 950 Rue Royal, Apt. 1505, Trois Rivieres, Quebec, Canada

[21] Appl. No.: 161,296

[22] Filed: Jun. 20, 1980

[51] Int. Cl.³ .................. G09F 27/00; A63H 33/26
[52] U.S. Cl. ........................................ 40/456; 46/240
[58] Field of Search ............... 40/456; 46/240, 236, 46/237, 238, 239

[56] References Cited

U.S. PATENT DOCUMENTS

| 1,544,645 | 7/1925 | Johnson | 40/456 |
| 2,282,430 | 5/1942 | Smith | 46/240 |
| 2,881,001 | 4/1959 | Chisholm et al. | 40/456 |
| 2,918,284 | 12/1959 | Baca | 46/240 |
| 3,976,296 | 8/1976 | Smith | 46/240 |

FOREIGN PATENT DOCUMENTS 1064577 12/1953 France .................. 46/240

Primary Examiner—Robert Peshock
Assistant Examiner—Michael J. Foycik
Attorney, Agent, or Firm—Alan Swabey; Robert Mitchell; Guy J. Houle

[57] ABSTRACT

A phonograph including a lower casing having a turntable. A cover is removably positionable over this turntable and has a top wall disposed in fixed parallel relationship to the plane of the turntable. The cover is made of a non-magnetizable material. A magnetizing disc is provided and having a plurality of magnets secured in a spaced apart manner on an upper face thereof. A drive post is provided and has a detachably securable end to connect to the disc and space the disc above the turntable. The post also has an engaging opposed end to engage with a center hole in the turntable to impart axial rotation to the post when the turntable rotates, whereby to impart a rotational drive to the disc to cause free displacement of magnetically attractable elements disposed on an outer surface of the cover when positioned thereover. The post is a threaded post and the disc is selectively secured along the post between two threaded elements in threaded engagement with the post on opposed sides of the disc whereby the spacing of the disc with respect to the cover top wall is adjustable to regulate the strength of the magnetic field on the said elements.

6 Claims, 2 Drawing Figures

PHONOGRAPH ACTUATED ELEMENTS

BACKGROUND OF INVENTION (a) Field of the Invention

The present invention relates to a magnetizing disc for use with a phonograph having a cover to support magnetically displaceable elements on a top face thereof whereby when the magnetizing disc is rotated by the turntable of the phonograph, the displaceable elements on the cover will move in a predetermined manner whereby to give a visual effect simultaneously with the audible effect produced by the phonograph record on the turntable.

(b) Description of Prior Art

It is known to displace magnetically attractable elements on a support surface by moving a magnet under the support surface. The present invention relates to the adaptation of this principle to a phonograph whereby the magnetically attractable elements are automatically displaced in a predetermined manner on a top surface of a cover of the phonograph.

SUMMARY OF INvENTION

It is a feature of the present invention to provide a magnetizing disc which is supported and rotated by a phonograph turntable and positionable adjacent a support surface of a phonograph cover to impart a motion to magnetically attractable elements positioned on the support surface.

A further feature of the present invention is to provide a magnetizing disc which is reversible and which carries a different orientation of magnets on each surface thereof.

A still further feature of the present invention is to provide a magnetizing disc which is adjustable in spacing with respect to a support surface of the cover whereby to adjust the strength of the magnetic field on the elements.

According to the above features, from a broad aspect, the present invention provides a phonograph comprising a lower casing having a turntable. A cover is removably positionable over this turntable and has a top wall disposed in fixed parallel relationship to the plane of the turntable. The cover is made of a non-magnetizable material. A magnetizing disc is provided and having a plurality of magnets secured in a spaced apart manner on an upper face thereof. A drive post is provided and has a detachably securable end to connect to the disc and space the disc above the turntable. The post also has an engaging opposed end to engage with a center hole in in the turntable to impart axial rotation to the post when the turntable rotates, whereby to impart a rotational drive to the disc to cause free displacement of magnetically attractable elements disposed on an outer surface of the cover when positioned thereover. The post is a threaded post and the disc is selectively secured along the post between two threaded elements in threaded engagement with the post on opposed sides of the disc whereby the spacing of the disc with respect to the cover top wall is adjustable to regulate the strength of the magnetic field on the said elements.

BRIEF DESCRIPTION OF DRAWINGS

A preferred embodiment of the present invention will now be described with reference to the example thereof as illustrated in the accompanying drawings, in which.

DESCRIPTION OF PREFERRED EMBODIMENTS

Figure 1:
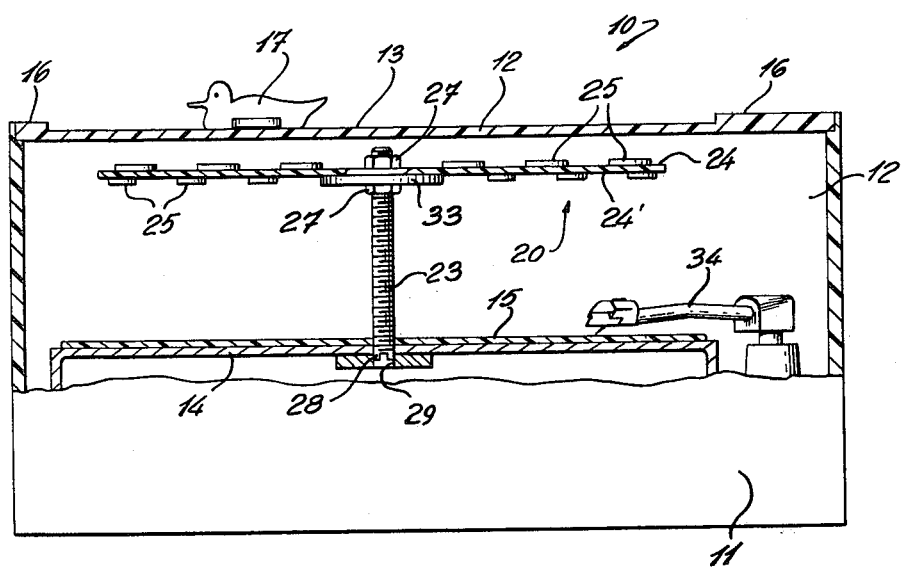
FIG. 1 is a fragmented section view of a phonograph having the magnetizing disc of the present invention adapted thereto.

Referring to the drawings, and more particularly to FIG. 1, there is shown generally at 10, a phonograph housing comprising a lower casing 11 having a cover 12 hinged to an upper part thereof. As herein shown, the cover is constructed of a non-magnetizable material, herein plastic, and has a flat top portion 13 extending parallel to the turntable 14 and in spaced relationship thereabove. As herein shown, the flat portion 13 is recessed in the upper wall of the cover and extends in an area at least as large as the surface area of a phonograph disc 15 which is placed on the turntable 14. A ridge 16 is formed about the recessed flat top portion 13 whereby one or more magnetically attractable elements 17 may be displaced on the surface 13 and prevented from movement beyond the delineated flat top portion 13.

Figure 2:
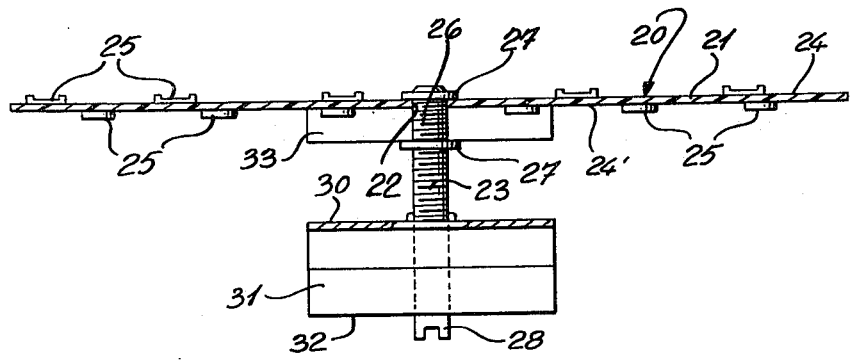
FIG. 2 is a side view showing the construction of the magnetizing disc with a variation thereof.

Referring now additionally to FIG. 2, there is shown the construction of the magnetizing disc 20 of the present invention. As herein shown, the disc is formed of a flat circular plate 21 having a hole 22 at the center thereof for receiving drive means, herein a drive post 23 therethrough. The flat circular plate has opposed surfaces 24 and 24' with one or more, herein a plurality, of magnets 25 secured in a predetermined pattern along one or more circular paths on each of the surfaces 24 and 24'. The magnets 25 are secured in a different predetermined pattern on each of the opposed surfaces 24 and 24'. The drive post 23 is a threaded post having a detachably securable end 26 to connect to the disc by its insertion through the hole 22 and its threaded engagement with a threaded nut 27 on opposed sides of the flat circular plate 21. The opposed end of the post 23 is an engaging end 28 adapted to secure with the center engaging hole 29 at the center of the turntable 14. Thus, the post 23 will impart a rotational drive to the magnetizing disc 20 when the engaging end 28 is secured to the turntable and the turntable is rotated.

As shown in FIG. 2, a circular plate 30 may be secured to the post a predetermined distance above the engaging opposed end 28 and connectable to a circular hub 31 which is commonly used with phonograph discs used at a rotational speed of 45 rpm. The hub 31 will be accommodated in the central hole of such phonograph disc.

Although not shown, the post 23 could be terminated short of the bottom end 32 of the circular hub 31 and the engaging end of the drive post would then be through the bottom end 32 of the hub 31 which would be in frictional contact with any size phonograph disc secured on the turntable. The weight of the magnetizing disc 20 would be sufficient to maintain substantially stationary contact between the bottom end 32 of the circular hub and the top surface of the phonograph disc 15.

In order to add structural rigidity to the flat circular plate 21, a structural support plate 33 may be permanently secured to one of the opposed surfaces 24 or 24' and concentric with the hole 22. It can be seen that this type of securement of the magnetizing disc 20 permits the disc 20 to be secured to the drive post 23 at any predetermined distance along its length which is threadable with the threaded nuts 27. Thus, by varying the spacing of the upper surface 24 of the disc 20 with respect to the cover 12, the strength of the magnetic field of the magnets 25 can be regulated to obtain the proper spacing for the displacement of the magnetically attractable elements 17. By lowering the disc 20 along the drive post 23, the field becomes weaker and the elements 17 will not react in the same manner. Accordingly, this adjustment may also vary the pattern of displacement of the magnetically attractable elements 17 as well as the selection of the predetermined orientation of the magnets 25 on each of the opposed surfaces 24 and 24'. Of course, various magnetizing discs 20 may be provided, each having a different predetermined orientation of magnets thereon to impart still different motions to the magnetically attractable elements 17.

In operation, a disc 15 is placed on the phonograph and the drive post 23 is engaged with the turntable 14. The magnetizing disc 20 is secured adjacent a top end of the drive post 23. The turntable is actuated with the needle arm 34 placed on the disc 15. The cover 12 is then closed and the magnetically attractable elements 17 are placed on the flat top portion 13. As the disc rotates, the orientation of the magnets 25 thereon will cause the elements 17 to move along the top portion 13 and also simultaneously rotate upon themselves.

As herein shown, the flat circular plate 21 is constructed of a plastics material. However, the plate 21 may be constructed of a magnetically insulating material whereby the magnets 25 on the opposed surface 24' will not have any effect upon the magnetic field created by the magnets 25 on the top surface 24.

It is within the ambit of the present invention to provide any obvious modifications of the example of the preferred embodiment described herein, provided such modifications fall within the scope of the appended claims.

I claim:

1. A phonograph comprising a lower casing having a turntable, a cover removably positionable over said turntable and having a top wall disposed in fixed parallel relationship to the plane of said turntable, said cover being of a non-magnetizable material, a magnetizing disc having a plurality of magnets secured in a spaced apart manner on an upper face thereof; a drive post having a detachably securable end to connect to said disc and space said disc above said turntable, and an engaging opposed end to engage with a center hole in said turntable to impart axial rotation to said post when said turntable rotates whereby to impart a rotational drive to said disc to cause free displacement of magnetically attractable elements disposed on an outer surface of said cover when positioned thereover; said post being a threaded post, said disc being selectively secured along said post between two threaded elements in threaded engagement with said post on opposed sides of said disc whereby the spacing of said disc with respect to said cover top wall is adjustable to regulate the strength of the magnetic field on said elements.

2. A phonograph as claimed in claim 1 wherein said disc has opposed flat surfaces, said disc being reversibly connectable to said drive post, said magnets being secured in a different predetermined pattern on said opposed flat surfaces whereby said magnetically attractive elements will be displaced in a predetermined manner dependent on a selected one of said opposed surfaces being positioned facing said cover.

3. A phonograph as claimed in claim 1 wherein a circular plate is secured to said post a predetermined distance above said engaging opposed end of said post, and a circular hub removably securable under said plate to concentrically position phonograph records on said turntable.

4. A phonograph as claimed in claim 1 wherein said disc is a circular disc of magnetically insulating material, a hole in the center of said disc to receive said post, and a structural support plate secured to one of said opposed faces of said disc about said hole.

5. A phonograph as claimed in claim 1 wherein said magnetically attractive elements are miniature figurines having a magnetically attractive element secured to a base thereof.

6. A phonograph as claimed in claim 1 wherein said outer surface of said cover is a flat portion extending over an area at least as large as the surface area of said disc, and a ridge formed about said flat portion to prevent said magnetically attractive elements from being displaced outside said surface.

* * * * *